United States Patent [19]
Ishii

[11] Patent Number: 5,204,740
[45] Date of Patent: Apr. 20, 1993

[54] IMAGE SIGNAL DECODING APPARATUS

[75] Inventor: Yoshiki Ishii, Yokohama, Japan

[73] Assignee: Canon Kabushiki Kaisha, Tokyo, Japan

[21] Appl. No.: 920,166

[22] Filed: Jul. 27, 1992

Related U.S. Application Data

[63] Continuation of Ser. No. 852,495, Mar. 17, 1992, which is a continuation of Ser. No. 752,978, Sep. 3, 1991, which is a continuation of Ser. No. 569,730, Aug. 21, 1990, which is a continuation of Ser. No. 459,264, Dec. 29, 1989.

[30] Foreign Application Priority Data

Jan. 14, 1989 [JP] Japan ..................... 1-6498

[51] Int. Cl.$^5$ ............ H04N 7/12; H04N 7/13
[52] U.S. Cl. ................ 358/105; 358/133; 358/138
[58] Field of Search ............ 358/105, 133, 138

[56] References Cited
U.S. PATENT DOCUMENTS

| | | |
|---|---|---|
| 4,862,264 | 8/1989 | Wells ................... 358/138 |
| 4,885,631 | 12/1989 | Fukinuki ............... 358/105 |
| 4,912,770 | 3/1990 | Seto ..................... 358/105 |

Primary Examiner—Howard W. Britton
Attorney, Agent, or Firm—Fitzpatrick, Cella, Harper & Scinto

[57] ABSTRACT

An image signal decoding apparatus for decoding a transmitted image information signal into an original image signal: wherein a one frame image signal constructed of a plurality of image signals is divided into a plurality of blocks each constructed of a plurality of image signals; a block characteristic information signal and a coded information signal are received on a block unit (block-by-block) basis; and in accordance with a decision result by a motion decision circuit, either the image signals in another block corresponding to the same image in a block which was decided as being incapable of being decoded into original image signals, or the image signals of another block corresponding to a different image in the block decided as being incapable of being decided, are selected; and the selected image signals are interpolated as interpolation image signals. Any image motion can therefore be detected at once, and an adaptive interpolation can be effected in accordance with the image motion information.

37 Claims, 1 Drawing Sheet

IMAGE SIGNAL DECODING APPARATUS

This application is a continuation of application Ser. No. 07/852,495 filed Mar. 17, 1992, which was a continuation of application Ser. No. 07/752,978, filed Sep. 3, 1991, which was a continuation of application Ser. No. 07/569,730, filed Aug. 21, 1990, which is a continuation of application Ser. No. 07/459,264, filed Dec. 29, 1989.

BACKGROUND OF THE INVENTION

1. Field of the Invention

The present invention relates to an image signal decoding apparatus for decoding digital image signals.

2. Related Background Art

As a coding method, there is known a DC separation vector quantization method by which image data are efficiently coded on a block unit (block-by-block) basis. According to this method, an image represented by image data is divided into a plurality of blocks, and the distribution of levels of image data within a block concentrates near at the 0 level of the image data has subtracted from each level the mean value of the image data within the block. By positively using this fact, the image data with the mean value subtracted therefrom are vector-quantized, and the quantized data and mean value data are transmitted.

During the transmission of image data coded in accordance with the above-described coding method, if the information representative of the characteristic of a block, such as the mean value data of image data within the block, becomes deficient, it becomes impossible to decode the coded image data into the original image data on the block unit basis. The image reproduced by using such deficient decoded image data becomes visually poor. It is therefore necessary to reduce the visual deterioration by performing, on the block unit basis, an interpolation of the image data of a block without the mean value data, with image data of another block.

If an inter-frame interpolation, which uses image data of an image already transmitted, is used for an interpolation of image data of a block without the mean value data, with image data of another block on the block unit basis, the image at a still image area can be improved visually to a large extent. In order to decide if a block to be interpolated belongs to a still image area, the motion amount of an image represented by image data in a block capable of being decoded and near the first-mentioned block, is estimated. If it is judged that the block incapable of being decoded belongs to a still image area, the block incapable of being decoded is interpolated by means of the inter-frame interpolation. If a nearby block capable of being decoded is used in detecting motion of an image represented by image data in a block, the image motion detection cannot be obtained until the nearby block capable of being decoded has been completely decoded. An immediate interpolation at that time is therefore not possible, leaving a disadvantage in decoding. Further, all the image data are required to be compared for the purpose of interpolation upon occurrence of a mean value data deficiency, so that it is wasteful in that a long calculation time and a large number of calculation circuits become necessary.

SUMMARY OF THE INVENTION

It is an object of the present invention to provide an image signal decoding apparatus capable of solving the above problems.

It is another object of the present invention to provide an image signal decoding apparatus capable of detecting image motion at once, and of effecting an application interpolation process in accordance with the image motion information.

According to one aspect of the present invention achieving the above objects, there is provided an image signal decoding apparatus for decoding a transmitted image information signal into an original image signal, comprising:

decision means for dividing a one frame image signal made up of a plurality of image signals into a plurality of blocks each comprising a plurality of image signals, receiving a block characteristic information signal and a coded information signal on the block unit basis, said block characteristic information signal representing the characteristic of a block and said coded information signal being obtained by high-efficiency coding of a plurality of image signals constituting each of said plurality of divided blocks in accordance with said block characteristic information signal, and deciding if the image signals can be decoded or not in accordance with said received block characteristic information signal and coded information signal of a block;

motion decision means for deciding if there is motion of an image represented by the image signals of a block, in accordance with said block characteristic information signal among said block characteristic information signal and coded information signal received on the block unit basis; and interpolation means for selecting, in accordance with the decision result provided by said motion decision means, either the image signals in another block corresponding to the same image in a block which was decided by said decision means to be incapable of being decoded into original image signals, or the image signals of another block corresponding to a different image in said block identified as incapable of being decoded, and interpolating said selected image signals as interpolation image signals.

The other objects, advantages and features of the present invention will become apparent from the following detailed description of the preferred embodiment when read in conjunction with the accompanying drawings.

DETAILED DESCRIPTION OF THE PREFERRED EMBODIMENT

Figure 1:
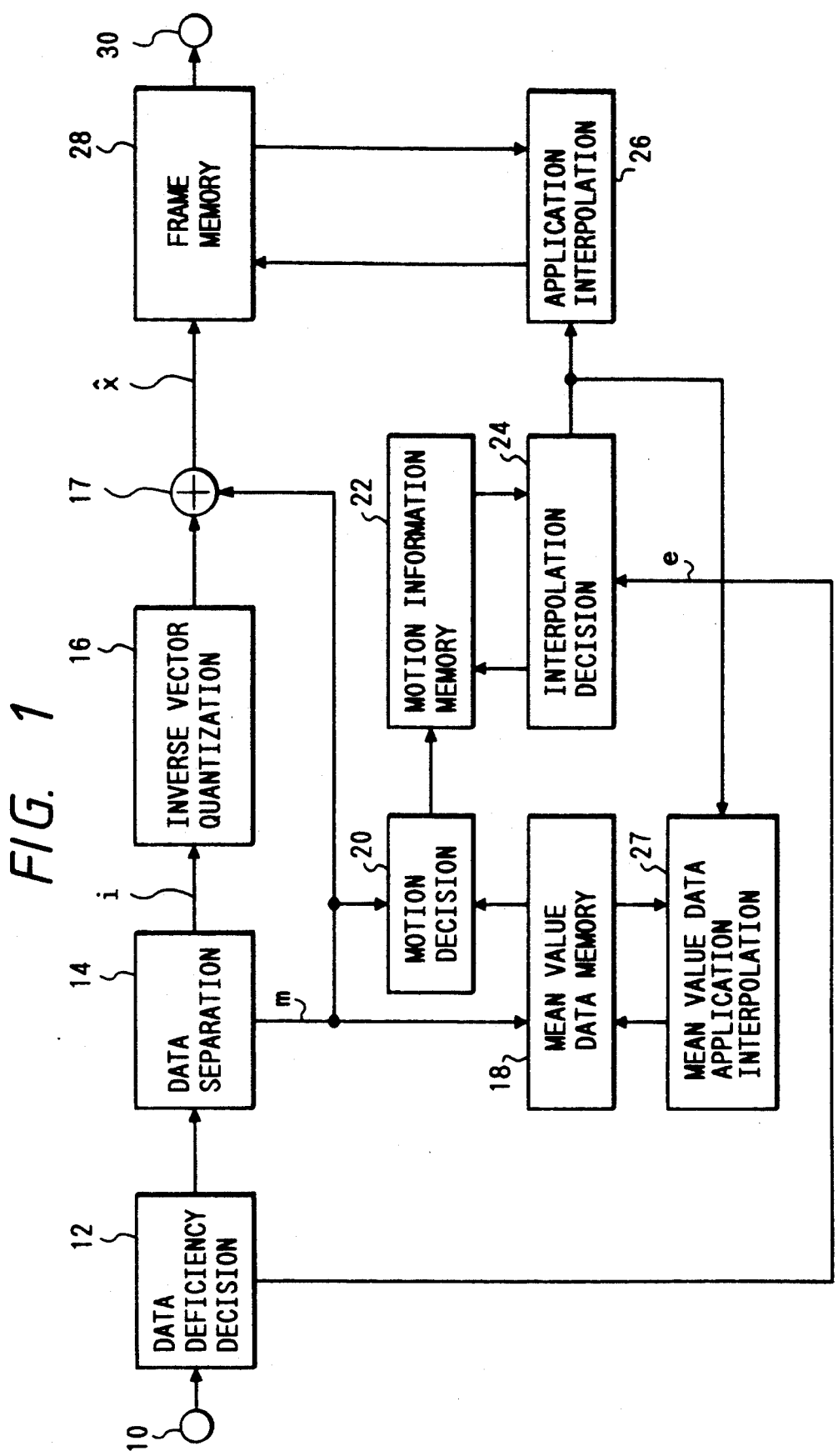
FIG. 1 is a block diagram showing the structure of a decoding apparatus embodying the present invention in an image data transmission system using a DC separation vector quantization method.

The preferred embodiment of the present invention will be described with reference to the accompanying drawings.

FIG. 1 is a block diagram showing the structure of a decoding apparatus embodying the present invention in an image data transmission system using a DC separation vector quantization method. Reference numeral 10 designates an input terminal for receiving transmission data supplied from a transmission line. Transmission data compressed by the DC separation vector quantization are inputted to the input terminal 10. A data deficiency decision circuit 12 decides presence/absence of data deficiency in each data block of the transmission data. A data separation circuit 14 separates each data block of the transmission data into a mean value data m (block characteristic information) of image data and a vector quantized data i (image information in data block) obtained by quantizing the data obtained by subtracting the image data mean value m from the image data in a data block. An inverse vector quantization circuit 16 inversely quantizes the vector quantized data i. An addition circuit 17 adds together the data outputted from the inverse quantization circuit 16 and the image data mean value m of the data block outputted from the data separation circuit 14.

A mean value data memory 18 stores therein mean value data of one frame blocks. A motion decision circuit 20 decides a presence/absence of an image motion of each block by comparing the presently supplied mean value data with the mean value data already stored in the mean value data memory 18. A motion information memory 22 stores therein a decision result obtained by the motion decision circuit 20. An interpolation decision circuit 24 decides an interpolation method by estimating an presence/absence of an image motion in a deficient block in accordance with image motion information on a nearby data block. An adaptive interpolation circuit 26 carries out an inter-frame interpolation for a block belonging to a still image area, and an intra-frame interpolation for a block belonging to a moving image area, respectively in accordance with a decision given by the interpolation decision circuit 24. A mean value data adaptive interpolation circuit 27 interpolates mean value data of the block with data deficiency in accordance with the interpolation method used by the adaptive interpolation circuit 26. A frame memory 28 stores therein decoded data from the addition circuit 17 and interpolated data from the adaptive interpolation circuit 26.

The operation of the decoding apparatus constructed as shown in FIG. 1 will be described. Transmission data inputted from the transmission line to the input terminal are supplied to the data deficiency circuit 12 which decides a presence/absence of data deficiency of each data block of the transmission data. If it is decided that there is a data deficiency, a deficient block signal e is supplied to the interpolation decision circuit 24. The data of a block decided by the data deficiency decision circuit 12 as no data deficiency are supplied to the data separation circuit 14 and separated into the mean value data m and vector quantized data i. The inverse vector quantization circuit 16 inversely quantizes the vector quantized data i. The addition circuit 17 adds together the inversely quantized data supplied from the inverse vector quantization circuit 16 and the mean value data m supplied from the data separation circuit 14, and outputs decoded image data.

The mean value data m outputted from the data separation circuit 14 are supplied also to the mean value data memory 18 and motion decision circuit 20. The motion decision circuit 20 compares the mean value data at the same block position before one frame stored in the mean value data memory 18, with the present mean value data supplied from the data separation circuit 14. The motion decision circuit 20 decides a presence/absence of an image motion in the block, e.g., by deciding if the difference between the mean values exceeds a predetermined threshold value. The decision result by the motion decision circuit 20 is expressed by using a predetermined number of bits which are stored in the motion information memory 22. The data stored in the mean value data memory 18 are updated each time mean value data for a new frame are inputted.

In the above processes, for a block without data deficiency, the decoded data are stored in the frame memory 28, and the data representative of motion information are stored in the motion information memory 22. In contrast, for a block with data deficiency, the interpolation decision circuit 24 refers to the data representative of motion information stored in the motion information memory 22 to thereby estimate the image motion information of the block with data deficiency in accordance with the motion information of a block near the block with data deficiency among those blocks whose data can be decoded. The estimation result is stored, as the image motion information of the block with data deficiency, in the motion information memory 22, and supplied to the adaptive interpolation circuit 26 and mean value data adaptive interpolation circuit 27.

The adaptive interpolation circuit 26 selects the inter-frame interpolation if the block to be interpolated belongs to still-image area, and the intraframe interpolation if it belongs to a moving-image area. The adaptive interpolation circuit 26 generates interpolation data by using the decoded image data stored in the frame memory 28, and stores the interpolation data in the frame memory 28. Since the image data of one frame before are stored in the frame memory 28 at the position corresponding to the block without data deficiency, the inter-frame interpolation can be realized by inhibiting the data from being updated by the adaptive interpolation circuit 26. For the intra-frame interpolation, all the image data of a block with data deficiency are interpolated by using image data of a block near the block with data deficiency among those blocks which can be decoded.

The mean value data adaptive interpolation circuit 27 interpolates the mean value data of the block with data deficiency by using the same interpolation method to be used by the adaptive interpolation method, the interpolated mean value data being stored in the mean value data memory 18. Even if data deficiency occurs during two or more consecutive frames at the same block position, it is possible to identify image motion by using the interpolated mean value data.

The decoding apparatus for decoding coded data which uses the DC separation vector quantization has been used in this embodiment for the description of the present invention. The invention is also applicable to an image transmission system wherein image information is represented, for the transmission thereof, by the data (block characteristic information) representative of the characteristic of a block such as mean value data, and the image data (image information in block) in a block such as vector quantization data. The block characteristic information may use, instead of the above-described mean value data, a minimum value data representative of the minimum value of levels of image data in a block, maximum value data representative of the maximum value, dynamic range data representative of a dynamic range, middle value data representative of a middle value, or the like, or a combination of these data. The image information in a block may use, instead of the above-described vector quantized data with the mean value subtracted therefrom, such as data indicating to which level within the dynamic range of image data in a block the image data with the minimum value data subtracted therefrom belongs. In this case, the block characteristic data may use the minimum value data and maximum value data, the minimum value data and dynamic range data, and the like. As for the means for deciding an identifying image motion in a block, it may take the form of an arrangement in which the maximum, minimum or dynamic range data are compared with the corresponding data from one frame before to decide presence/absence of image motion in accordance with the comparison result. In this case, since the number of parameters for deciding an image motion increases, image motion (if any) can be determined more precisely to be present.

As readily understood from the foregoing description of the present invention, an image motion can be detected at once with a simple method, and an adaptive interpolation can be effected in accordance with the image motion information.

I claim:

1. An image signal decoding apparatus for decoding a transmitted image information signal into an original image signal, comprising:
 decision means for dividing a picture image signal comprising a plurality of image signals into a plurality of blocks each comprising a plurality of image signals, receiving a block characteristic information signal and a coded information signal on a block unit basis, said block characteristic information signal representing the characteristic of a block and said coded information signal being obtained by high-efficiency coding of a plurality of image signals constituting each of said plurality of divided blocks in accordance with said block characteristic information signal, and deciding if the image signals of the block can be decoded or not in accordance with said received block characteristic information signal and coded information signal of the block;
 motion decision means for deciding if there is motion of picture image represented by the image signals of the block, in accordance with said block characteristic information signal among said block characteristic information signal and coded information signal received on the block unit basis; and
 interpolation means for selecting, in accordance with the decision result provided by said motion decision means, either the image signals in another block included in the same picture image as that in which the block which was decided by said decision means as being incapable of being decoded into original image signals is included, or the image signals of another block which is included in a picture image distinct from that in which said block decided as being incapable of being decoded is included, and is located in a position corresponding to said block decided as incapable of being decoded and interpolating said selected image signals as interpolation image signals.

2. An image signal decoding apparatus according to claim 1, wherein said block characteristic information signal is a mean value signal representative of the mean value of levels of a plurality of image signals constituting a block.

3. An image signal decoding apparatus according to claim 1, wherein said block characteristic information signal is a maximum value signal representative of the maximum value of levels of a plurality of image signals constituting a block.

4. An image signal decoding apparatus according to claim 1, wherein said block characteristic information signal is a minimum value signal representative of the minimum value of levels of a plurality of image signals constituting a block.

5. An image signal decoding apparatus according to claim 1, wherein said block characteristic information signal is a dynamic range signal representative of the dynamic range of levels of a plurality of image signals constituting a block.

6. An image signal decoding apparatus according to claim 1, wherein said block characteristic information signal is a middle value signal representative of the middle value of levels of a plurality of image signals constituting a block.

7. An image signal decoding apparatus according to claim 1, wherein said motion decision means includes:
 block characteristic information signal storage means for storing said block characteristic information signals of blocks already received; and
 motion decision information signal generating means for comparing said block characteristic information signal of a block newly received with said block characteristic information signal stored in said block characteristic information signal storage means, and in accordance with the comparison result, generating a motion decision information signal representing if there is motion of an image represented by the image signals in a block.

8. An image signal decoding apparatus according to claim 7, wherein said motion decision means further includes:
 motion decision information signal storage means for temporarily storing said motion decision information signal generated by said motion decision information signal generating means; and
 storage control means for generating said motion decision information signal for the block decided by said decision means as being incapable of being decoded into original image signals, by using said motion decision information signal for a block decided as being capable of being decoded among those motion decision information signals stored in said motion decision information signal storage means, and storing said generated motion decision information signal in said motion decision information signal storage means.

9. An image signal decoding apparatus according to claim 7, wherein said motion decision means further includes:
 storage control means for generating said block characteristic information signal for the block decided by said decision means as being incapable of being decoded into original image signals, by using said block characteristic information signal for a block decided as being capable of being decoded among those block characteristic information signals stored in said block characteristic information signal storage means, and storing said generated block characteristic information signal in said block characteristic information signal storage means.

10. An image signal decoding apparatus for decoding transmitted image information signals into original image signals, comprising:
 (A) decision means for dividing a picture image signal comprising a plurality of image signals into a plurality of blocks each comprising a plurality of image signals, receiving a high-efficiency coded information signal on a block unit basis, said high-efficiency coded information signal being formed by high-efficiency coding a plurality of image signals constituting each of said plurality of divided blocks, and deciding if the original image signals can be decoded or not in accordance with said received high-efficiency coded information signal of a block; and (B) interpolation means for interpolating image signals of a second block, distinct from a first block, the first block being decided by said decision means as being incapable of being decoded into the original image signals, as interpolation image signals.

11. An image signal decoding apparatus according to claim 10, wherein said interpolation means is arranged such that said interpolation means interpolates, as the interpolation image signals, either the image signals in another block included in the same picture image as that in which the block which was decided by said decision means as being incapable of being decoded into the original image signals is included, or the image signals of another block which is included in a picture image distinct from that in which said block decided as incapable of decoding is included, and is located in a position corresponding to said block decided as incapable of decoding.

12. An image signal decoding apparatus according to claim 10, wherein said interpolation means is arranged such that said interpolation means interpolates, as the interpolation image signals, the image signals in another block which was decided by said decision means as being capable of being decoded into the original image signals and is different from a block decided by said decision means as being incapable of being decoded into the original image signals.

13. An image signal decoding apparatus according to claim 10, wherein said high-efficiency coded information signal comprises a block characteristic information signal representing the characteristics of each of said plurality of divided blocks and a coded information signal which is formed by high-efficiency coding a plurality of image signals respectively constituting said plurality of divided blocks on the basis of said block characteristic information signal.

14. An image signal decoding apparatus according to claim 13, wherein said interpolation means is arranged such that the image signal in another block included in the same picture image as that in which a block decided by said decision means as being incapable of being decoded into the original image signal is included, is interpolated as the interpolation image signal.

15. An image signal decoding apparatus according to claim 13, wherein said interpolation means is arranged such that the image signal of another block which is included in a picture image distinct from that in which said block decided by said decision means as being incapable of being coded into the original image signal is included, is interpolated as the interpolation image signal.

16. An image signal decoding apparatus according to claim 13, wherein said interpolation means is arranged such that the image signal of a block which is included in the same picture image as that in which a block decided by said decision means as being incapable of being decoded into the original image signal is included, and is adjacent to said decided block, is interpolated as the interpolation image signal.

17. An image signal decoding apparatus according to claim 13, wherein said interpolation means is arranged such that the image signal of another block which is included in a picture image immediately preceding a picture image in which a block decided by said decision means as being incapable of being decoded into the original image signal is included, is interpolated as the interpolation image signal.

18. An image signal decoding apparatus according to claim 13, wherein said interpolation means is arranged such that the image signal of another block which is included in a picture image immediately preceding a picture image in which a block decided by said decision means as being incapable of being coded into the original image signal is included, and is located at a position corresponding to that of said decided block, is interpolated as the interpolation image signal.

19. An image signal decoding apparatus according to claim 13, wherein said interpolation means is arranged such that one of the image signals of another block included in the same picture image as that in which a block decided by said decision means as being incapable of being decoded into the original image signal is included, and the image signal of another block included in a picture distinct from said picture image in which said decided block is included, is interpolated as the interpolation image signal.

20. An image signal decoding apparatus according to claim 13, wherein said block characteristic information signal is an average-value signal which represents the average value of levels of a plurality of image signals which respectively constitute said plurality of divided blocks.

21. An image signal decoding apparatus according to claim 13, wherein said block characteristic information signal is a maximum-value signal which represents the maximum value of levels of a plurality of image signals which respectively constitute said plurality of divided blocks.

22. An image signal decoding apparatus according to claim 13, wherein said block characteristic information signal is a minimum-value signal which represents the minimum value of levels of a plurality of image signals which respectively constitute said plurality of divided blocks.

23. An image signal decoding apparatus according to claim 13, wherein said block characteristic information signal is a dynamic-range signal which represents a dynamic range of levels of a plurality of image signals which respectively constitute said plurality of divided blocks.

24. An image signal decoding apparatus according to claim 13, wherein said block characteristic information signal is a middle-value signal which represents the middle value of levels of a plurality of image signals which respectively constitute said plurality of divided blocks.

25. An image signal decoding apparatus according to claim 13, further comprising movement discrimination means for discriminating whether there is movement in an image represented by the image signal of each block, by using said block characteristic information signal received for each block.

26. An image signal decoding apparatus according to claim 25, wherein said interpolation means is arranged such that one of the image signals of another block included in the same picture image as that in which a block decided by said decision means as being incapable of being decoded into the original image signal is included, and the image signal of another block included in a picture image distinct from the picture image in which said decided block is included, is selected according to the result of the discrimination of said movement discrimination means, and the selected image signal is interpolated as the interpolation image signal.

27. An image signal decoding apparatus according to claim 25, wherein said interpolation means is arranged such that one of the image signals of another decodable block included in the same picture image as that in which a block decided by said decision means as being incapable of being decoded into the original image signal is included and the image signal of another decodable block which is included in a picture image distinct from the picture image in which said decided block is included and is located at a position corresponding to that of said decided block, is selected according to the result of the discrimination of said movement discrimination means, and the selected image signal is interpolated as the interpolation image signal.

28. An image signal decoding apparatus for decoding transmitted image information signals into original image signals, comprising:
  (A) motion decision means for dividing a picture image signal comprising a plurality of image signals into a plurality of blocks each comprising a plurality of image signals, receiving a block characteristic information signal and a coded information signal on a block unit basis, said block characteristic information signal representing the characteristic of a block and said coded information signal being obtained by high-efficiency coding a plurality of image signals constituting each of said plurality of divided blocks in accordance with said block characteristic information signal, and
  deciding if there is motion of an image represented by the image signals of a block, in accordance with said block characteristic information signal among said block characteristic information signal and coded information signal received on the block unit basis; and
  (B) decoding means for decoding, in response to a result of decision of said motion decision means, the image signals of a block according to said block characteristic information signal and coded information signal received on the block unit basis.

29. An image signal decoding apparatus according to claim 28, wherein said block characteristic information signal is a mean value signal representative of the mean value of levels of a plurality of image signals constituting a block.

30. An image signal decoding apparatus according to claim 28, wherein said block characteristic information signal is a maximum value signal representative of the maximum value of levels of a plurality of image signals constituting a block.

31. An image signal decoding apparatus according to claim 28, wherein said block characteristic information signal is a minimum value signal representative of the minimum value of levels of a plurality of image signals constituting a block.

32. An image signal decoding apparatus according to claim 28, wherein said block characteristic information signal is a dynamic range signal representative of the dynamic range of levels of a plurality of image signals constituting a block.

33. An image signal decoding apparatus according to claim 28, wherein said block characteristic information signal is a middle value signal representative of the middle value of levels of a plurality of image signals constituting a block.

34. An image signal decoding apparatus according to claim 28, wherein said motion decision means includes:
  block characteristic information signal storage means for storing said block characteristic information signals of blocks already received; and
  motion decision information signal generating means for comparing said block characteristic information signal of a block newly received with said block characteristic information signal stored in said block characteristic information signal storage means, and in accordance with the comparison result, generating a motion decision information signal representing if there is a motion of an image represented by the image signals in a block.

35. An image signal decoding apparatus according to claim 34, further comprising decision means for deciding whether or not the original image signal can be decoded from the block characteristic information signal of each of the received blocks and the coded information signal.

36. An image signal decoding apparatus according to claim 34, wherein said motion decision means further includes:
  motion decision information signal storage means for temporarily storing said motion decision information signal generated by said motion decision information signal generating means; and
  storage control means for generating said motion decision information signal for the block decided by said decision means as being incapable of being decoded into original image signals, by using said motion decision information signal for a block decided as being capable of being decoded among those motion decision information signals stored in said motion decision information signal storage means, and storing said generated motion decision information signal in said motion decision information signal storage means.

37. An image signal decoding apparatus according to claim 34, wherein said motion decision means further includes:
  storage control means for generating said block characteristic information signal for the block decided by said decision means as being incapable of decoding into original image signals, by using said block characteristic information signal for a block decided as being capable of being decoded among those block characteristic information signals stored in said block characteristic information signal storage means, and storing said generated block characteristic information signal in said block characteristic information signal storage means.

* * * * *

UNITED STATES PATENT AND TRADEMARK OFFICE
CERTIFICATE OF CORRECTION

PATENT NO. : 5,204,740
DATED : April 20, 1993
INVENTOR(S) : YOSHIKI ISHII

It is certified that error appears in the above-identified patent and that said Letters Patent is hereby corrected as shown below:

On title page,

IN [56] REFERENCES CITED

Under U.S. PATENT DOCUMENTS, insert:
--4,575,756  3/1986  Furukawa ................ 358/136--.

Insert:        --     FOREIGN PATENT DOCUMENTS
        255289    2/1988   European Pat. Off.
        293189   11/1988   European Pat. Off. --.

IN [57] ABSTRACT

Line 15, "decided," should read --decoded,--.

COLUMN 1

Lines 21-22, "concentrates near" should read
            --concentrated near or--.

COLUMN 3

Line 21, "an" (both occurrences) should be deleted.

COLUMN 4

Line 21, "intraframe" should read --intra-frame--.

COLUMN 5

Line 3, "deciding an" should be deleted.
Line 13, "an" should be deleted.

UNITED STATES PATENT AND TRADEMARK OFFICE
CERTIFICATE OF CORRECTION

PATENT NO. : 5,204,740
DATED : April 20, 1993
INVENTOR(S) : YOSHIKI ISHII

It is certified that error appears in the above-identified patent and that said Letters Patent is hereby corrected as shown below:

<u>COLUMN 7</u>

Line 55, "coded" should read --decoded--.

<u>COLUMN 8</u>

Line 11, "coded" should read --decoded--.

<u>COLUMN 10</u>

Line 37, "the" should read --a--.

Signed and Sealed this

Twenty-sixth Day of July, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,204,740
DATED : April 20, 1993
INVENTOR(S) : Yoshiki Ishii

It is certified that error appears in the above-indentified patent and that said Letters Patent is hereby corrected as shown below:

Column 10

Line 30, "claim 34," should read —claim 35,—.
    Line 48, "claim 34," should read —claim 35,—.

Signed and Sealed this

Twenty-fifth Day of October, 1994

Attest:

BRUCE LEHMAN

*Attesting Officer*      *Commissioner of Patents and Trademarks*